(12) United States Patent
Powell

(10) Patent No.: US 6,190,261 B1
(45) Date of Patent: Feb. 20, 2001

(54) PUMP ASSEMBLY SHAFT GUARD

(75) Inventor: Jack Joseph Powell, Kettering, OH (US)

(73) Assignee: Flowserve Management Company, Irving, TX (US)

(*) Notice: Under 35 U.S.C. 154(b), the term of this patent shall be extended for 0 days.

(21) Appl. No.: 09/153,444

(22) Filed: Sep. 15, 1998

(51) Int. Cl.[7] .................................................. F16C 1/26
(52) U.S. Cl. ............................................. 464/170; 417/360
(58) Field of Search ............................... 464/170; 74/609; 138/163, 157; 248/49, 50, 146, 150, 151; 417/360, 423.6, 423.14

(56) References Cited

U.S. PATENT DOCUMENTS

| | | |
|---|---|---|
| 106,510 | 8/1870 | Sargent . |
| D. 250,119 | 10/1978 | Qualls . |
| 349,364 | 9/1886 | Roots . |
| 577,284 * | 2/1897 | Camp ................. 138/157 X |
| 600,375 | 3/1898 | Podeyn . |
| 726,737 * | 4/1903 | Nowak .................... 74/609 |
| 926,800 * | 7/1909 | Young ..................... 74/609 |
| 1,072,173 * | 9/1913 | Schlafly ............. 138/157 X |
| 1,238,590 | 8/1917 | Starker . |
| 1,531,285 * | 3/1925 | Hodgkinson ...... 464/170 X |
| 2,073,404 * | 3/1937 | Hobbs ................. 417/360 X |
| 2,382,539 * | 8/1945 | Brady, Jr. ........... 417/360 X |
| 2,491,035 | 12/1949 | Deacon . |
| 4,211,519 * | 7/1980 | Hogan ................... 417/360 |
| 4,308,931 | 1/1982 | Khanna . |
| 4,324,533 * | 4/1982 | Schroeder et al. ..... 417/360 |
| 4,552,494 * | 11/1985 | Wix .................... 74/609 X |
| 4,779,484 | 10/1988 | Poe . |
| 4,783,030 * | 11/1988 | Buerhop ............... 248/49 X |
| 5,092,191 * | 3/1992 | Blach .................. 464/170 X |
| 5,711,710 | 1/1998 | Brisk . |
| 6,095,897 * | 8/2000 | Stocker et al. ........... 451/5 |

* cited by examiner

Primary Examiner—Lynne H. Browne
Assistant Examiner—Greg Binda
(74) Attorney, Agent, or Firm—Killworth, Gottman, Hagan & Schaeff LLP

(57) ABSTRACT

A shaft guard is provided comprising a first guard portion, a second guard portion, and a pair of support legs. The first guard portion defines a first guard body, a first pair of guard portions, and a first pair of flange portions. The first guard body is arranged about a longitudinal shaft guard axis. The first pair of guard portion openings are positioned at opposite ends of the longitudinal shaft guard axis. The first pair of flange portions are arranged on opposite sides of the longitudinal shaft guard axis. Similarly, the second guard portion defines a second guard body, a second pair of guard portions, and a second pair of flange portions. The second guard body is arranged about the longitudinal shaft guard axis. The second pair of guard portion openings are positioned at opposite ends of the longitudinal shaft guard axis. The second pair of flange portions are arranged on opposite sides of the longitudinal shaft guard axis. Respective ones of the first pair of flange portions are secured to opposing ones of the second pair of flange portions to form respective mated flange pairs such that the respective ones of the first pair of guard portion openings complement opposing ones of the second pair of guard portion openings to form a pair of shaft guard openings positioned at opposite ends of the longitudinal shaft guard axis. The pair of support legs are secured to at least one of the first and second guard portions.

18 Claims, 5 Drawing Sheets

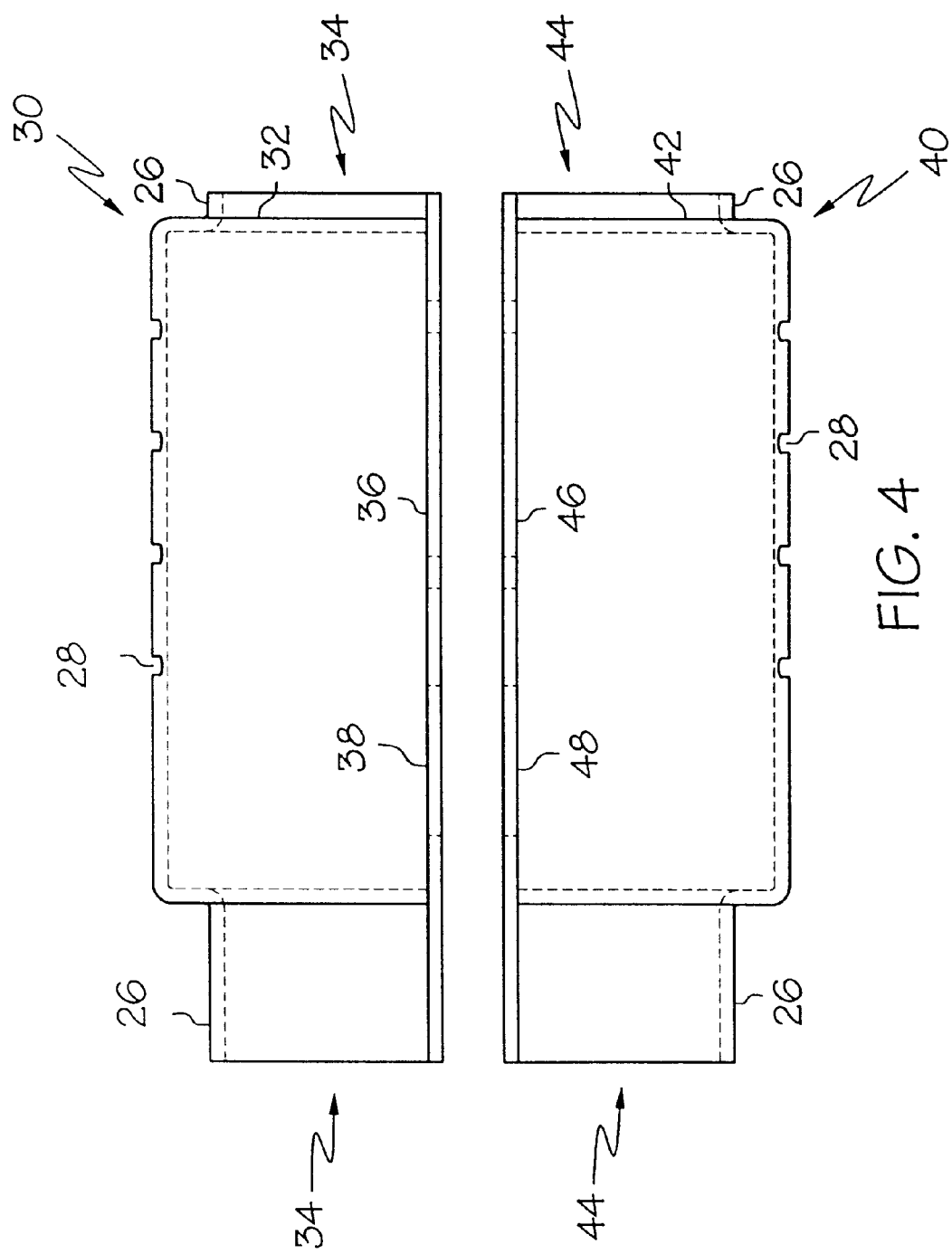

PUMP ASSEMBLY SHAFT GUARD

BACKGROUND OF THE INVENTION

The present invention relates to machinery sets where a shaft coupling requires guarding and, more particularly, to a guard to be positioned about the drive shaft or coupling of a fluid pumping assembly.

Pumping systems and other machinery sets utilizing a rotating shaft present a significant number of safety concerns to those designing, operating, and maintaining the systems. For example, a typical pumping system incorporates a number of pumping motors coupled to respective rotatable components of fluid pumps via a drive shaft or pump coupling. The drive shafts or couplings are typically enclosed or encased in a removable steel or aluminum shaft housing to permit convenient inspection and routine maintenance of the shaft or coupling while ensuring safe operation and maintenance of the pumping system.

These conventional shaft housings are a fairly common component of a pumping system. Accordingly, there is a continuing need in the fluid pumping industry for shaft housings incorporating new and improved operational features. Further, there is a continuing need in the industry for shaft housings that are less expensive to manufacture and easier to assemble, install, and remove.

BRIEF SUMMARY OF THE INVENTION

This need is met by the present invention wherein a shaft guard is provided comprising opposing, substantially identical, non-metallic, tinted, transparent guard portions and a pair of support legs including clamping portions for joining the opposing guard portions. The shaft guard of the present invention is constructed so as to be easily assembled, durable, and cost effective to produce.

In accordance with one embodiment of the present invention, a shaft guard is provided comprising a first guard portion, a second guard portion, and a pair of support legs. The first guard portion defines a first guard body, a first pair of guard portions, and a first pair of flange portions. The first guard body is arranged about a longitudinal shaft guard axis. The first pair of guard portion openings are positioned at opposite ends of the longitudinal shaft guard axis. The first pair of flange portions are arranged on opposite sides of the longitudinal shaft guard axis. Similarly, the second guard portion defines a second guard body, a second pair of guard portions, and a second pair of flange portions. The second guard body is arranged about the longitudinal shaft guard axis. The second pair of guard portion openings are positioned at opposite ends of the longitudinal shaft guard axis. The second pair of flange portions are arranged on opposite sides of the longitudinal shaft guard axis. Respective ones of the first pair of flange portions are secured to opposing ones of the second pair of flange portions to form respective mated flange pairs such that the respective ones of the first pair of guard portion openings complement opposing ones of the second pair of guard portion openings to form a pair of shaft guard openings positioned at opposite ends of the longitudinal shaft guard axis. The pair of support legs are secured to at least one of the first and second guard portions.

The first guard portion, the second guard portion, and respective ones of the first pair of flange portions may be arranged such that the first guard portion and the second guard portion define a substantially circular column enclosing substantially all of the longitudinal shaft guard axis. The first and second guard bodies may define at least one stepped-down diametrical region in which one of the shaft guard openings is defined. The stepped-down diametrical region may extend along the longitudinal shaft guard axis. The first and second guard bodies may define a pair of stepped-down diametrical regions positioned at opposite ends of the longitudinal shaft guard axis. The substantially circular column may define a pair of diametrically stepped-down regions at opposite ends of the longitudinal shaft guard axis.

At least one of the first guard portion and the second guard portion preferably includes ventilation ports formed therein. Each of the respective flange portions preferably includes a flange slot formed therein, wherein opposing ones of the slots are arranged to lie in registration with one another to form a support leg passage in each of the mated flange pairs, and wherein each of the pair of support legs extends through one of the support leg passages. The support legs may be arranged to secure the respective ones of the first pair of flange portions to opposing ones of the second pair of flange portions. The support legs may be arranged to secure the flange portions by clamping the respective ones of the first pair of flange portions to opposing ones of the second pair of flange portions. Each of the support legs may include a shoulder portion, an extension portion, and a clamping portion, wherein the extension portion extends from the shoulder portion, through one of the support leg passages, to the clamping portion, and wherein one of the mated flange pairs is secured between the clamping portion and the shoulder portion.

In accordance with another embodiment of the present invention, a shaft guard is provided comprising a first guard portion and a second guard portion. The first guard portion defines a first guard body, a first pair of guard portion openings, and a first pair of flange portions. The first guard body is arranged about a longitudinal shaft guard axis. The first pair of guard portion openings are positioned at opposite ends of the longitudinal shaft guard axis. The first pair of flange portions are arranged on opposite sides of the longitudinal shaft guard axis. Similarly, the second guard portion defines a second guard body, a second pair of guard portion openings, and a second pair of flange portions. The second guard body is arranged about the longitudinal shaft guard axis. The second pair of guard portion openings are positioned at opposite ends of the longitudinal shaft guard axis. The second pair of flange portions are arranged on opposite sides of the longitudinal shaft guard axis. At least one of the first guard portion and the second guard portion is transparent. Respective ones of the first pair of flange portions are secured to opposing ones of the second pair of flange portions such that the respective ones of the first pair of guard portion openings complement opposing ones of the second pair of guard portion openings to form a pair of shaft guard openings positioned at opposite ends of the longitudinal shaft guard axis. The transparent guard portion may be tinted with a predetermined color.

In accordance with yet another embodiment of the present invention, a pump assembly is provided comprising a motor, a fluid pumping mechanism, a drive shaft arranged to couple movement of the motor with movement of the fluid pumping mechanism, and a shaft guard according to the present invention.

Accordingly, it is an object of the present invention to provide an improved shaft guard or housing that is less expensive to manufacture and easier to assemble, install, and remove. Further, it is an object of the present invention to provide a non-metallic and non-sparking shaft guard that is transparent and may be tinted to enhance the safety of those in the vicinity of the guard. Other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which:

FIG. 4 is an exploded side view of the shaft guard of FIG. 3;

DETAILED DESCRIPTION OF THE PREFERRED EMBODIMENTS

Figure 1:
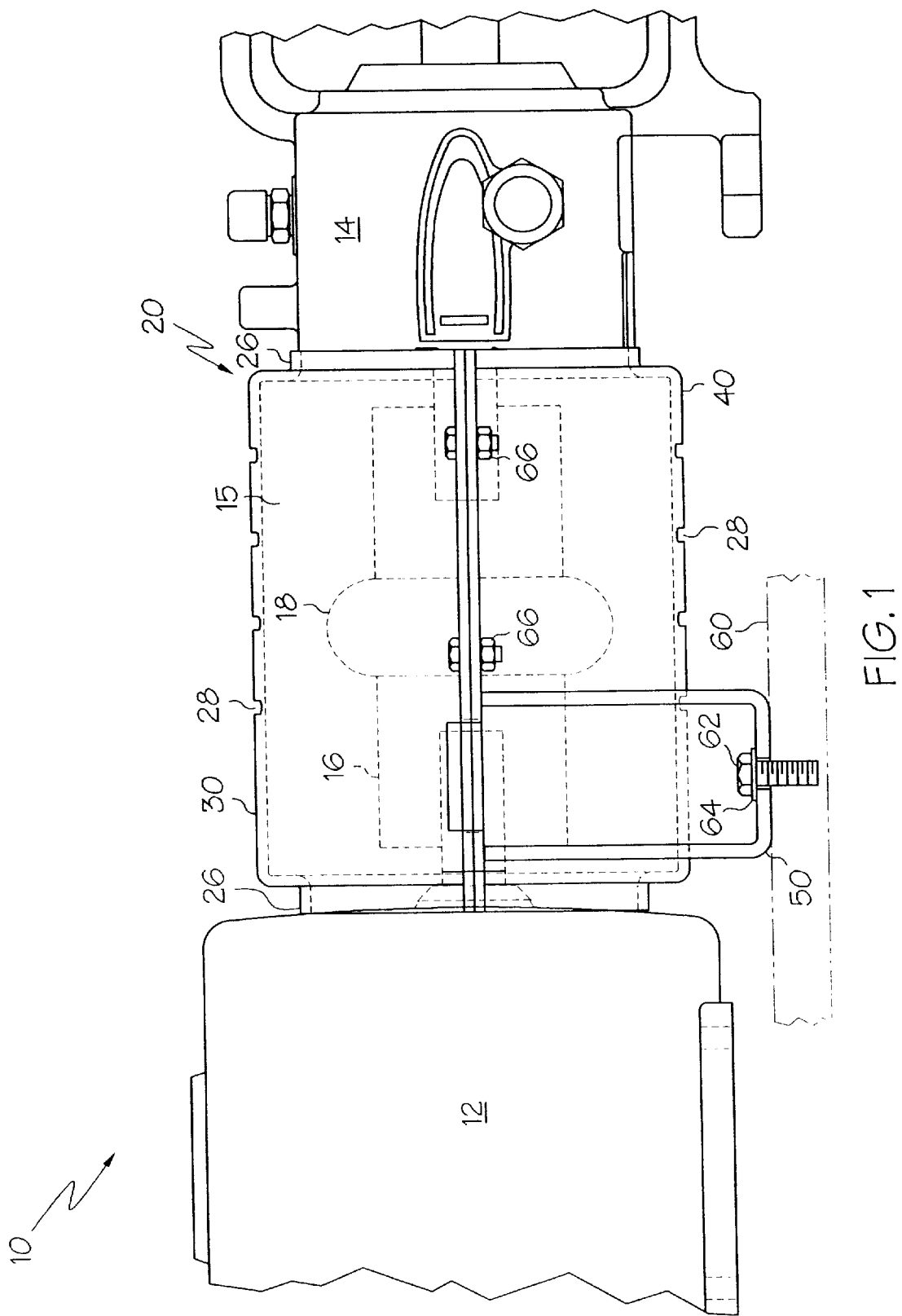
FIG. 1 is an illustration of a pump assembly according to the present invention.
Figure 3:
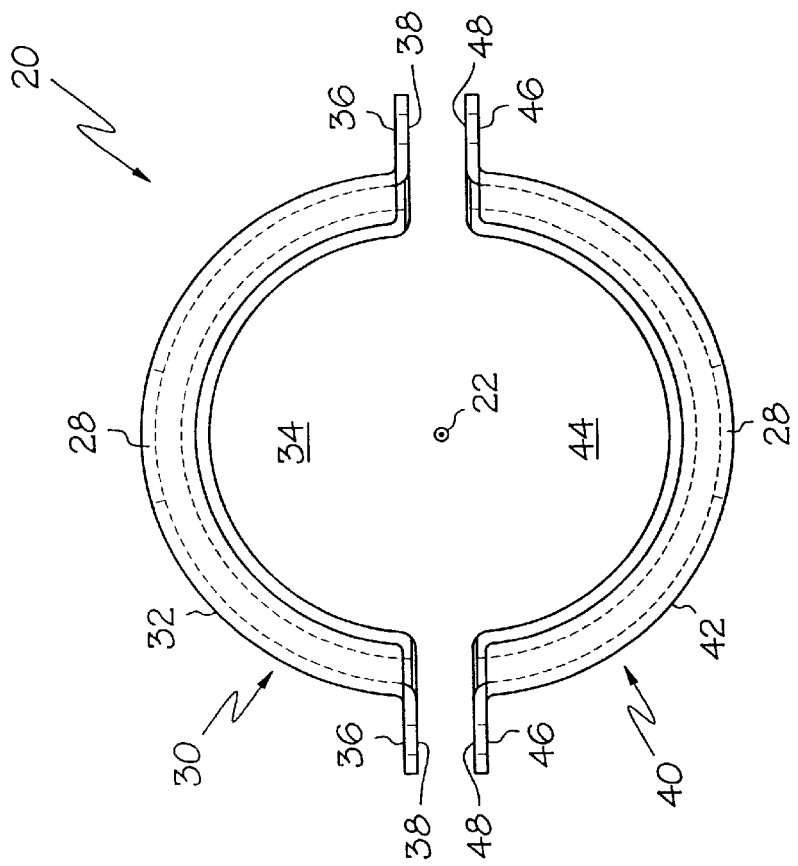
FIG. 3 is an exploded end view of a portion of a shaft guard according to the present invention.
Figure 2:
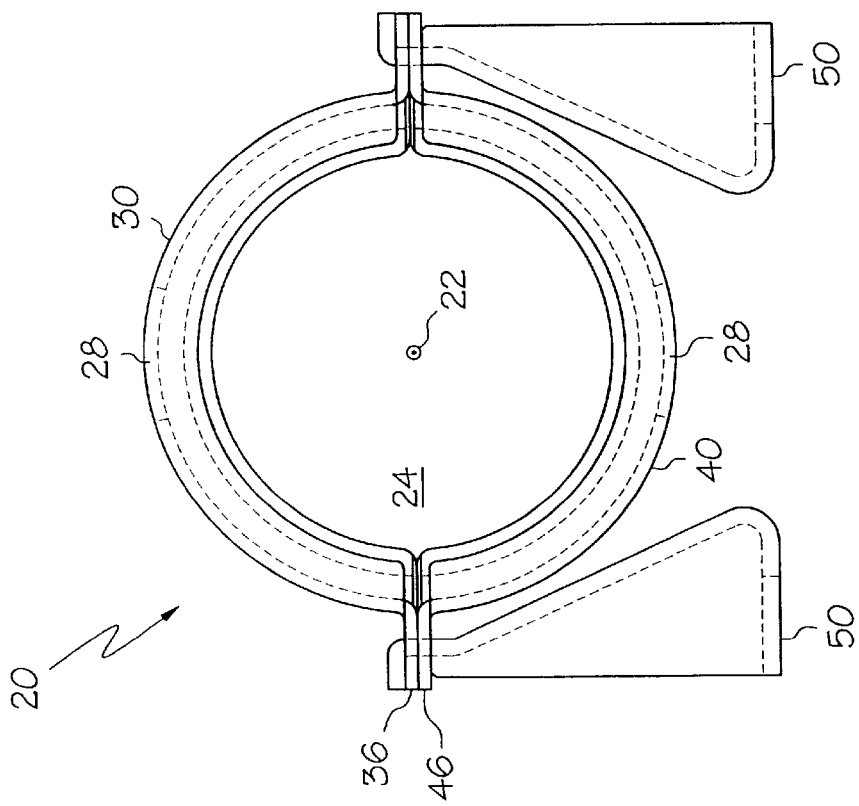
FIG. 2 is an end view of a shaft guard according to the present invention.
Figure 5:
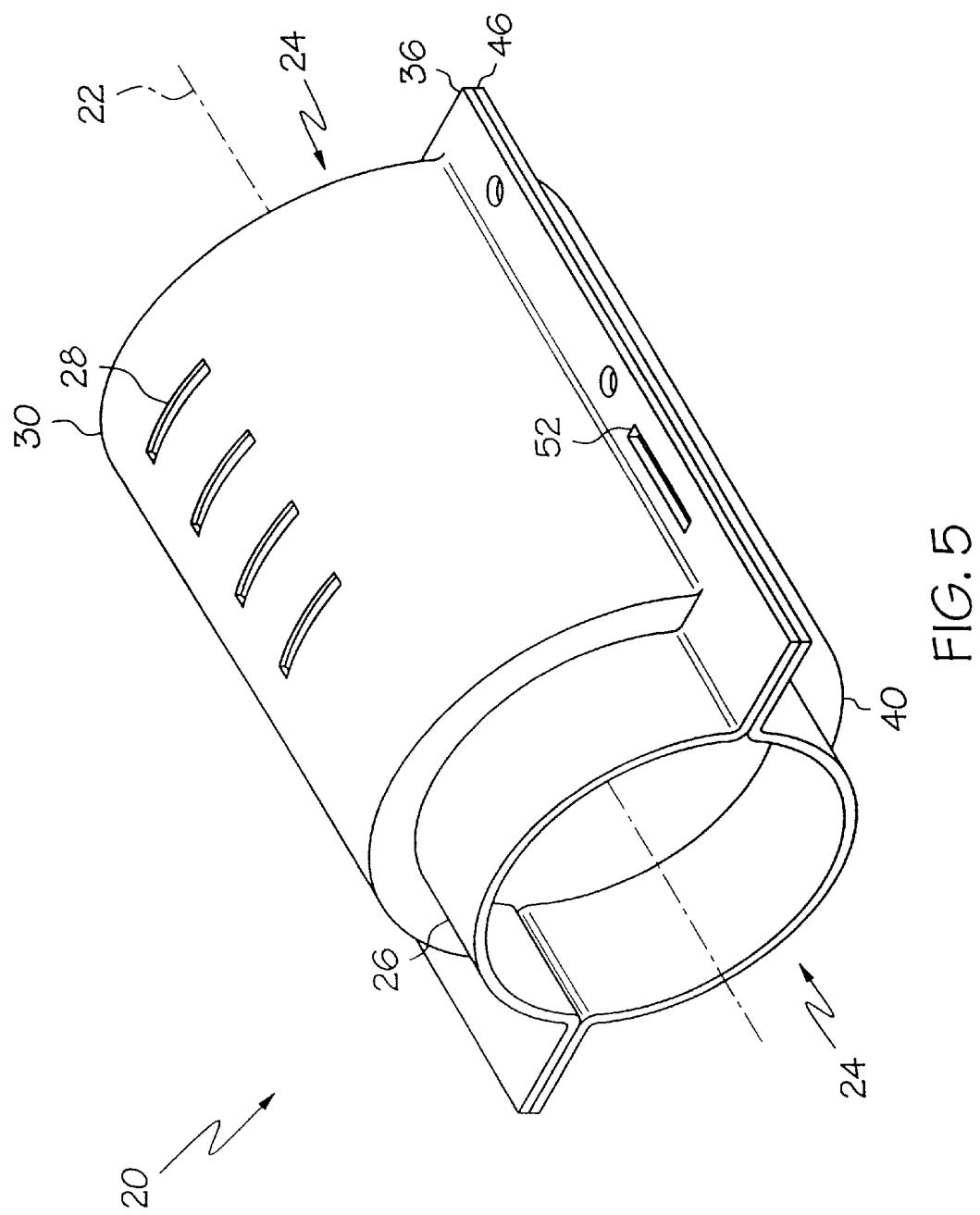
FIG. 5 is a non-exploded isometric view of a portion of the shaft guard illustrated in FIGS. 3 and 4.

A pump assembly 10 according to the present invention is illustrated in FIGS. 1 and 2. The pump assembly 10 comprises a motor 12, a fluid pumping mechanism 14, a drive shaft 16 arranged to couple movement of the motor 12 with movement of the fluid pumping mechanism 14, and a shaft guard 20.

Figure 7:
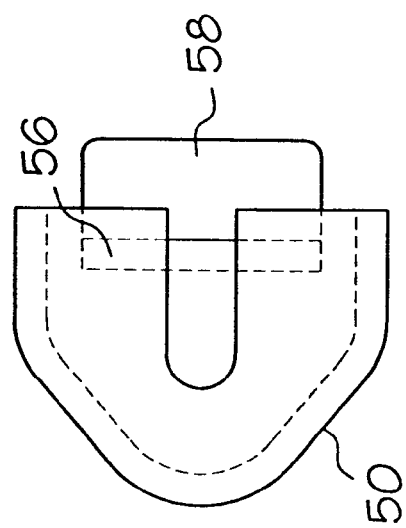
FIGS. 6 and 7 illustrate a support leg arrangement of a shaft guard according to the present invention.

Referring collectively to FIGS. 1–5 the shaft guard 20 defines a longitudinal shaft guard axis 22 and comprises a first guard portion 30, a substantially identical second guard portion 40, and a pair of single-piece support legs 50. Preferably, the first guard portion 30 and the second guard portion 40 are made of a transparent material that is tinted a predetermined color to indicate that the shaft guard 20 is positioned about potentially dangerous moving parts. Although the shaft guard 20 includes components that are tinted, the tinting is such that transparency of the components is preserved. As will be described in further detail below with respect to FIGS. 6 and 7, the pair of support legs 50 are preferably secured to the first and second guard portions 30, 40.

The first guard portion 30 defines a first guard body 32, a first pair of guard portion openings 34, and a first pair of flange portions 36. The first guard body 32 is arranged about the longitudinal shaft guard axis 22. The first pair of guard portion openings 34 are positioned at opposite ends of the longitudinal shaft guard axis 22. The first pair of flange portions 36 are arranged on opposite sides of the longitudinal shaft guard axis 22. The second guard portion 40 defines a second guard body 42, a second pair of guard portion openings 44, and a second pair of flange portions 46. The second guard body 42 is arranged about the longitudinal shaft guard axis 22. The second pair of guard portion openings 44 are positioned at opposite ends of the longitudinal shaft guard axis 22. The second pair of flange portions 46 are arranged on opposite sides of the longitudinal shaft guard axis 22. The first pair of flange portions 36 are secured to opposing ones of the second pair of flange portions 46 to form respective mated flange pairs. When the opposing flange portions 36, 46 are mated in this manner, respective ones of the first pair of guard portion openings 34 complement opposing ones of the second pair of guard portion openings 44 to form a pair of shaft guard openings 24 positioned at opposite ends of the longitudinal shaft guard axis 22.

The first and second guard bodies 32, 42 define stepped-down diametrical regions 26 positioned at opposite ends of the longitudinal shaft guard axis. Respective shaft guard openings 24 are defined in the stepped-down diametrical regions 26. Preferably, one of the stepped-down regions 26 extends along the longitudinal shaft guard axis 22 to provide an area of the shaft guard 20 that may be trimmed to fit the length of the drive shaft 16 and match the spacing between the motor 12 and the fluid pumping mechanism 14. Additionally, the first guard portion 30 and the second guard portion 40 include ventilation ports 28 formed therein.

As is clearly illustrated in FIG. 1, the shaft guard 20 is arranged to define an uninterrupted circumferential passage 15 enclosing the drive shaft 16 and avoids contact with the drive shaft 16 and the drive shaft coupling 18 The uninterrupted circumferential passage extends from the motor 12 to the fluid pumping mechanism 14.

The first guard portion 30 and the second guard portion 40 are arranged such that respective ones of the first pair of flange portions 36 are secured to opposing ones of the second pair of flange portions 46. The first guard portion 30, the second guard portion 40, and respective ones of the first pair of flange portions 36 and the second pair of flange portions 46 are arranged such that the first guard portion 30 and the second guard portion 40 define a substantially circular column enclosing substantially all of the longitudinal shaft guard axis 22.

Figure 6:
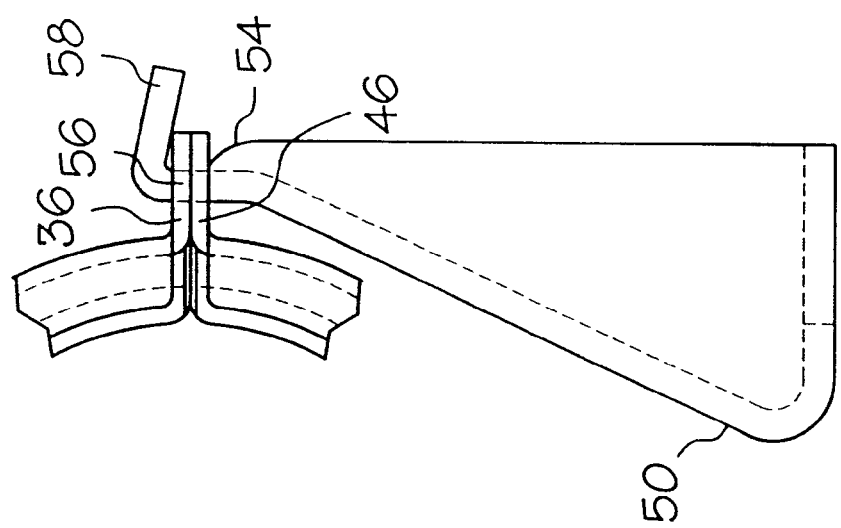

Each of the respective flange portions 36, 46 includes a flange slot 38, 48 formed therein and opposing ones of the slots 36, 46 are arranged to lie in registration with one another to form a support leg passage 52 in each of the mated flange pairs. As is illustrated in FIGS. 2 and 6, each of the pair of support legs 50 extends through one of the support leg passages 52 and are arranged to secure the respective ones of the first pair of flange portions 36 to opposing ones of the second pair of flange portions 46 by clamping respective ones of the first pair of flange portions 36 to opposing ones of the second pair of flange portions 46. Specifically, referring to FIGS. 6 and 7, each of the support legs 50 includes a shoulder portion 54, an extension portion 56, and a clamping portion 58. The extension portion 56 extends from the shoulder portion 54, through one of the support leg passages 52, to the clamping portion 58. The mated pair of flanges 36, 46 are secured between the clamping portion 58 and the shoulder portion 54.

Referring again to FIG. 1, after the mated pair of flanges 36, 46 are secured between the clamping portion 58 and the shoulder portion 54, the support legs 50 are secured to a pump assembly base plate 60, or some other stationary surface, with a suitable hold-down fastener, e.g., a hex bolt 62 and washer 64. In this manner, the shaft guard 20 may be quickly secured to a stationary object, allowing the person installing the shaft guard to attend to any other necessary assembly tasks. For example, upon securing the shaft guard 20 to the base plate 60, the respective guard portions 30, 40 may be additionally secured together with complementary nut and bolt hardware 66.

Having described the invention in detail and by reference to preferred embodiments thereof, it will be apparent that modifications and variations are possible without departing from the scope of the invention defined in the appended claims.

What is claimed is:

1. A shaft guard comprising:
   a first guard portion defining
      a first guard body arranged about a longitudinal shaft guard axis,
      a first pair of guard portion openings positioned at opposite ends of said longitudinal shaft guard axis, and a first pair of flange portions arranged on opposite sides of said longitudinal shaft guard axis;

a second guard portion defining
- a second guard body arranged about said longitudinal shaft guard axis,
- a second pair of guard portion openings positioned at opposite ends of said longitudinal shaft guard axis, and
- a second pair of flange portions arranged on opposite sides of said longitudinal shaft guard axis, wherein respective ones of said first pair of flange portions are secured to opposing ones of said second pair of flange portions,
  - each of said respective flange portions includes a flange slot formed therein, and
  - opposing ones of said slots are arranged to lie in registration with one another to form a support leg passage in each of said mated flange pairs; and a pair of support legs secured to at least one of said first and second guard portions, wherein each of said pair of support legs extends through one of said support leg passages.

2. A shaft guard as claimed in claim 1 wherein said first and second guard bodies define at least one stepped-down diametrical region and wherein one of said shaft guard openings is defined in said first stepped-down diametrical region.

3. A shaft guard as claimed in claim 2 wherein said stepped-down diametrical region extends along said longitudinal shaft guard axis.

4. A shaft guard as claimed in claim 1 wherein said first and second guard bodies define a pair of stepped-down diametrical regions positioned at opposite ends of said longitudinal shaft guard axis and wherein one of said pair of shaft guard openings is positioned in each of said pair of stepped-down diametrical regions.

5. A shaft guard as claimed in claim 1 wherein said first guard portion and said second guard portion are arranged such that, and wherein respective ones of said first pair of flange portions are secured to opposing ones of said second pair of flange portions such that, said first guard portion and said second guard portion enclose substantially all of said longitudinal shaft guard axis.

6. A shaft guard as claimed in claim 1 wherein said first guard portion and said second guard portion are arranged such that respective ones of said first pair of flange portions are secured to opposing ones of said second pair of flange portions and such that said first guard portion and said second guard portion define a substantially circular column enclosing substantially all of said longitudinal shaft guard axis.

7. A shaft guard as claimed in claim 6 wherein said substantially circular column defines a pair of diametrically stepped-down regions at opposite ends of said longitudinal shaft guard axis.

8. A shaft guard as claimed in claim 1 wherein at least one of said first guard portion and said second guard portion includes ventilation ports formed therein.

9. A shaft guard as claimed in claim 1 wherein said first guard portion is substantially identical to said second guard portion.

10. A shaft guard as claimed in claim 1 wherein each of said support legs is a single piece member.

11. A shaft guard as claimed in claim 1 wherein said support legs are arranged to secure said respective ones of said first pair of flange portions to opposing ones of said second pair of flange portions.

12. A shaft guard as claimed in claim 1 wherein said support legs are arranged to secure said flange portions by clamping said respective ones of said first pair of flange portions to opposing ones of said second pair of flange portions.

13. A shaft guard as claimed in claim 1 wherein each of said support legs include a shoulder portion, an extension portion, and a clamping portion, wherein said extension portion extends from said shoulder portion, through one of said support leg passages, to said clamping portion, and wherein one of said mated flange pairs is secured between said clamping portion and said shoulder portion.

14. A shaft guard as claimed in claim 13 wherein each of said support legs is a single piece member.

15. A pump assembly comprising a motor, a fluid pumping mechanism, a drive shaft extending across a space defined between said motor and said fluid pumping mechanism and arranged to couple movement of said motor with movement of said fluid pumping mechanism, and a shaft guard, said shaft guard comprising:

a first guard portion defining
- a first guard body arranged about a longitudinal shaft guard axis,
- a first pair of guard portion openings positioned at opposite ends of said longitudinal shaft guard axis, and
- a first pair of flange portions arranged on opposite sides of said longitudinal shaft guard axis;

a second guard portion defining
- a second guard body arranged about said longitudinal shaft guard axis,
- a second pair of guard portion openings positioned at opposite ends of said longitudinal shaft guard axis, and
- a second pair of flange portions arranged on opposite sides of said longitudinal shaft guard axis, wherein respective ones of said first pair of flange portions are secured to opposing ones of said second pair of flange portions forming respective mated flange pairs such that said respective ones of said first pair of guard portion openings complement opposing ones of said second pair of guard portion openings to form a pair of shaft guard openings positioned at opposite ends of said longitudinal shaft guard axis; and at least one support leg secured to at least one of said first and second guard portions, wherein said shaft guard is arranged to define an uninterrupted circumferential passage enclosing said drive shaft, and wherein said passage extends from said motor to said fluid pumping mechanism.

16. A pump assembly as claimed in claim 15 wherein at least one of said first guard portion and said second guard portion are transparent.

17. A pump assembly as claimed in claim 16 wherein said transparent guard portion is tinted with a predetermined color.

18. A pump assembly as claimed in claim 15 wherein said first guard portion and said second guard portion are arranged such that, and wherein respective ones of said first pair of flange portions are secured to opposing ones of said second pair of flange portions such that, said first guard portion and said second guard portion enclose substantially all of said longitudinal shaft guard axis.

* * * * *

UNITED STATES PATENT AND TRADEMARK OFFICE
CERTIFICATE OF CORRECTION

PATENT NO. : 6,190,261 B1  
DATED : February 20, 2001  
INVENTOR(S) : Jack Joseph Powell Page 1 of 1

It is certified that error appears in the above-identified patent and that said Letters Patent is hereby corrected as shown below:

<u>Column 4,</u>  
Line 15, "coupling 18 The" should read -- coupling 18. The --.

Signed and Sealed this

Twenty-eighth Day of August, 2001

Attest:

NICHOLAS P. GODICI  
*Attesting Officer*  *Acting Director of the United States Patent and Trademark Office*